United States Patent
Lindman

[11] Patent Number: 5,911,854
[45] Date of Patent: Jun. 15, 1999

[54] METHOD OF PURIFYING ELECTRIC PRECIPITATOR ASH USING A PRESSURE FILTER

[75] Inventor: Nils Lindman, Enskede, Sweden

[73] Assignee: Kvaerner Pulping AB, Sweden

[21] Appl. No.: 08/817,193

[22] PCT Filed: Sep. 15, 1995

[86] PCT No.: PCT/SE95/01043

§ 371 Date: Apr. 11, 1997

§ 102(e) Date: Apr. 11, 1997

[87] PCT Pub. No.: WO96/12847

PCT Pub. Date: May 2, 1996

[30] Foreign Application Priority Data

Oct. 20, 1994 [SE] Sweden ................................. 9403598

[51] Int. Cl.$^6$ ................................................. D21C 11/00
[52] U.S. Cl. ................................. 162/29; 162/30.11
[58] Field of Search .................. 162/29, 30.1, 30.11, 162/62

[56] References Cited

U.S. PATENT DOCUMENTS

| | | | |
|---|---|---|---|
| 3,833,462 | 9/1974 | Moy et al. ................................. | 162/30 |
| 4,929,355 | 5/1990 | Ragnegard et al. ..................... | 210/784 |
| 5,352,332 | 10/1994 | Maples et al. .......................... | 162/30.1 |

OTHER PUBLICATIONS

Enzykopädie der technischen Chemie, pp. 793–796, 801–802, 1929.

Ullmanns Encyklopädie der technischen Chemie, pp. 156–158, 178–181, 1972.

*Primary Examiner*—Peter Chin
*Assistant Examiner*—Dean T. Nguyen
*Attorney, Agent, or Firm*—Fasth Law Offices; Rolf Fasth

[57] ABSTRACT

The invention relates to a process for purifying electric precipitator ash of chlorides and potassium by means of leaching, filtering and washing a filter cake, with the leaching being carried out using water and recirculated filtrate from a previous washing. The process is characterized in that the filtration and the washing of the filter cake, and, where appropriate, the leaching, take place in a pressure filter in one and the same vessel.

7 Claims, 1 Drawing Sheet

METHOD OF PURIFYING ELECTRIC PRECIPITATOR ASH USING A PRESSURE FILTER

BACKGROUND TO THE INVENTION

In the cellulose industry, paper pulp is produced by cooking wood chips with cooking liquors. After the cooking, the requirement is to recover the chemicals and energy in the spent liquors by means of combustion. This takes place following evaporation in recovery boilers.

As a consequence of more stringent environmental restrictions, an ever greater amount of the material which was previously discharged from pulp mills is now recirculated. This results in increased contents of non-process elements such as chloride and potassium.

In addition to this, it is becoming ever more important to keep the contents of chloride and potassium in the chemical cycle at a low level in order to ensure trouble-free operation in association with high steam values.

For these reasons, there is a growing need for effective methods of removing chloride and potassium from the chemical cycles employed in the cellulose industry.

STATE OF THE ART

A suitable way of removing the undesirable substances from the chemical cycle is to purify the electric precipitator dust from the recovery boilers before it is returned to the black liquor, since this ash is enriched in chloride and potassium. The methods which are currently employed for expelling chloride and potassium are therefore based on removing chloride and potassium from the electric precipitator ash by means of leaching, filtering and washing the filter cake.

U.S. Pat. No. 3,833,462 discloses a process for purifying electric precipitator ash of sodium chloride by means of leaching, filtering and washing the filter cake, with hot water mixed with recirculated filtrate being used for the leaching. In this instance, the leaching is carried out using a special vessel, after adjusting the pH to produce a weakly acidic solution in order to convert carbonate to sulfate. After the leaching, purified ash is separated off.

An ash of this nature which is to be purified typically has a composition which is relatively low in chloride and potassium. This is due to the fact that low contents are necessary subsequently in order to avoid disturbances at high steam values. An ash which is to be leached can typically have the following composition:

| Component | % by weight |
| --- | --- |
| $Na_2SO_4$ | 86 |
| $Na_2CO_3$ | 5 |
| NaCl | 2 |
| KCl | 7 |

After the leaching, the ash is almost completely freed of chloride and potassium.

The quantity which is removed together with the filtrate, which is conducted to the discharge point, corresponds to the net quantity which is supplied to the chemical cycle.

It has been found in leaching and evaporation experiments that it is relatively easy to achieve a solution which is saturated with respect to sodium sulfate and sodium carbonate. However, it is not possible to achieve a saturated solution when electric precipitator ash is being purified continuously in a mill in which it is desired to maintain a very low content of chloride and potassium using a conventional process. When the content of the undesirable substances in the ash is low, the selectivity for expelling these substances becomes very poor.

As a result of the poor selectivity which is achieved when leaching ash containing low contents of chloride and potassium, the aim is to leach using a solution in which the concentrations of all the components are as high as possible. However, the upper limit is set by the pumpability of the slurry which is formed during the leaching.

The difficulty in handling the slurry also results in preference being given to continuously operating apparatus. A batchwise mode of operation leads to a risk of the slurry pump and pipe conduits becoming blocked with incrustations.

However, a continuous mode of operation suffers from some disadvantages. The greatest disadvantage is probably the fact that it is impossible to prevent some of the ash passing through the leaching vessel so rapidly that its content of chloride and potassium does not have time to dissolve out. Another disadvantage is that it is difficult to arrange for the filter cake to be washed effectively by means of displacement with water.

DESCRIPTION OF THE INVENTION

In view of that which has been mentioned above, the object of the present invention is substantially to increase efficiency and selectivity when leaching electric precipitator ash for the purpose of removing chloride and potassium therefrom. The object of the invention is achieved by means of a process for purifying electric precipitator ash of chlorides and potassium by means of leaching, filtering and washing a filter cake, with the leaching being carried out using water and recirculated filtrate from a previous washing, which process is characterized in that the filtration and the washing of the filter cake, and, where appropriate, the leaching, take place in a pressure filter in one and the same vessel.

Consequently, in the pressure filter, leaching, filtering and washing the filter cake can take place in the same vessel, so that the pumping of slurry is avoided. The pressure filter which is used can be of a type which is conventionally employed within the chemical industry.

According to one embodiment of the invention, the actual leaching is carried out in a separate vessel and the filtration and the washing of the filter cake take place in the pressure filter.

It is preferred that a sufficient amount of the filtrate is recirculated to ensure that the contents of chloride and potassium approach saturation point. It is also preferred for the leaching to take place using a ratio between the quantities of electric precipitator ash, recirculated filtrate and water which is such that the filtrate from leaching with this solution is saturated with respect to sodium sulfate and sodium carbonate but not with respect to sodium chloride and potassium salts. It is particularly preferred for the leaching to take place using a mixture of recirculated filtrate and water in a ratio of from 10:1 to 1:1.

The leaching preferably takes place at a temperature of between 50° C. and 100° C., and the filtration preferably takes place using a pressure difference across the filter cake of 0.5–10 bar.

According to a preferred embodiment of the invention, the filter cake is dried in the pressure filter in order to decrease the quantity of water which is supplied to the black liquor and which lowers the dry substance content of the latter.

An advantage of the process according to the invention is that the ash can be separated off by filtration using a substantially larger drop in pressure across the filter cake than is conventionally the case.

BRIEF DESCRIPTION OF THE DRAWING

The attached drawing

DESCRIPTION OF THE PREFERRED EMBODIMENT

Figure 1:
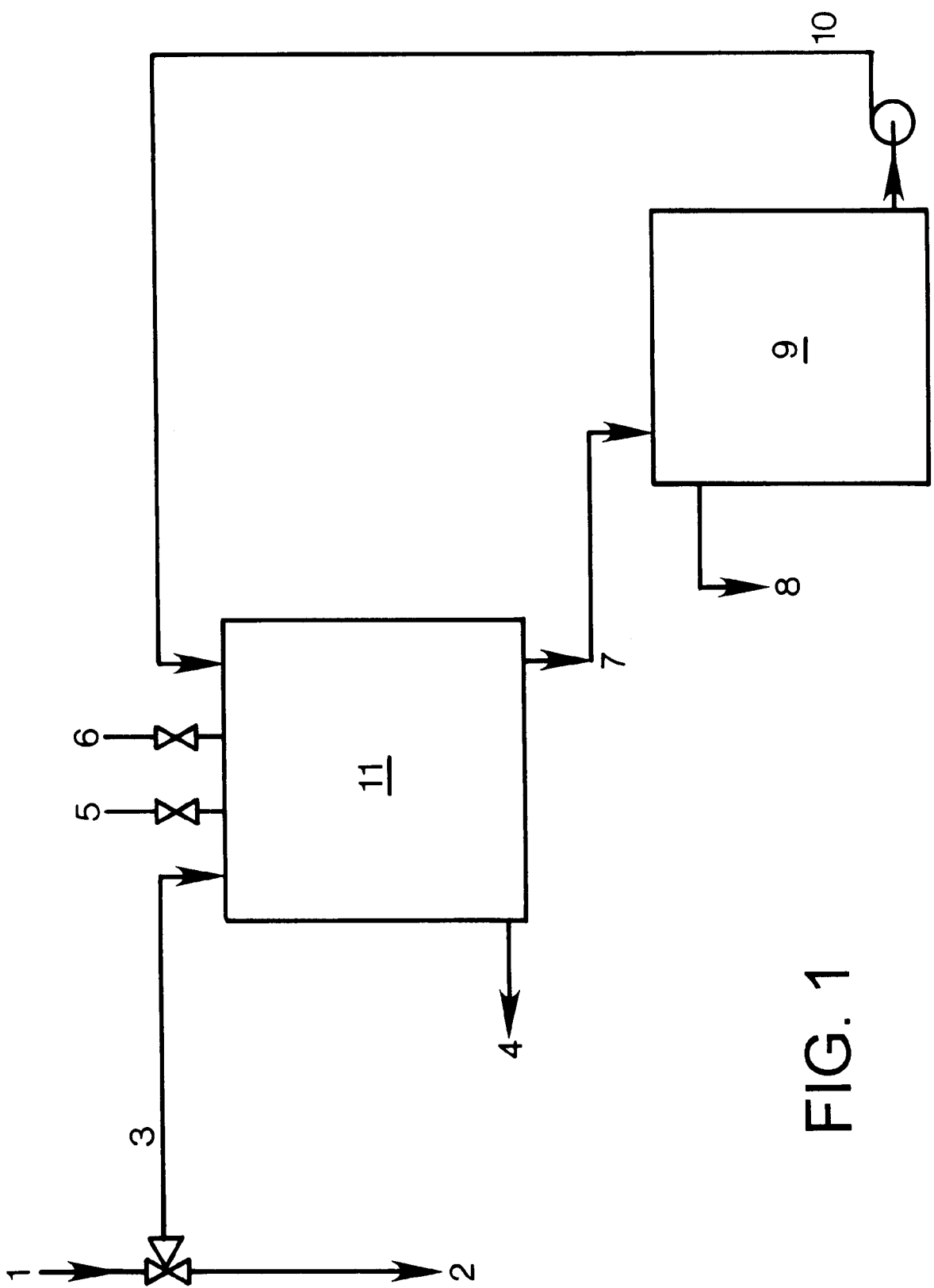
FIG. 1, shows a preferred embodiment of the process according to the invention in flow diagram form.

The preferred embodiment of the process according to the invention is described below with reference to the attached drawing.

Electric precipitator ash is introduced into the pressure filter 11 via the conduits 1 and 3 (electric precipitator ash is also fed into the process via 2) and is leached in the pressure filter 11 using a small quantity of water, which is supplied via the conduit 5, and recirculated filtrate, which is introduced via the conduit 10. By these means, the solution becomes saturated with respect to sulfate and carbonate. Approximately 120 liters of fresh water and recirculated filtrate are required per 100 kg of ash.

The pressure filter is pressurized with compressed air via the conduit 6 and the leaching takes place at approximately 70° C. After the leaching, the liquid phase is separated off by filtration, and a certain quantity of the filtrate is conducted, via the conduit 7, to an intermediate storage vessel 9. The remainder of the filtrate is conveyed to the discharge point or to a point where it can be subjected to further processing. Having reached the intermediate storage vessel 9, part of the filtrate is then recirculated to the pressure filter 11 via the conduit 10 and part of the filtrate is fed to the discharge point via a spillway 8.

Following the filtration, the filter cake still contains a certain quantity of leaching solution and consequently also chloride and potassium which are present in this solution. This residual filtrate should be removed from the filter cake before the latter is conveyed back to the mixer tank of the recovery boiler. The residual solution is separated off relatively simply by displacing it with water, which is supplied in finely divided form over the filter cake and is drawn through the latter. The solution which has been displaced is conducted to the intermediate storage vessel 9 so that it can be recirculated to the next leaching cycle via the conduit 10.

The moist filter cake is preferably dried in the pressure filter and is returned to the process via the conduit 4.

In order to increase the capacity of the system, the ash can be leached in a separate vessel (not shown) which is placed upstream of the pressure filter. This vessel is expediently placed directly above the filter so that the slurry can run down into the filter vessel and does not require to be pumped.

EXAMPLE

In the set-up shown in the drawing, 1633 kg of ash are leached per hour in three cycles. In each cycle, 544 kg of electric precipitator ash are leached with 500 l of recirculated filtrate and 168 l of water. After the leaching, 568 l of filtrate are drawn off to the intermediate storage vessel. A good 60% of this solution is conveyed to the discharge point and the remainder is used for the next leaching. After that, the filter cake is washed with 268 l of water. The solution which has been displaced from the filter cake is conveyed to the intermediate storage vessel where it is mixed with the filtrate which has been saved.

The electric precipitator ash which is to be purified has the following composition:

| Component | % by weight |
| --- | --- |
| Sodium | 30.7 |
| Potassium | 3.7 |
| Chloride | 4.3 |
| Carbonate | 3.0 |
| Sulfate | 58.2 |

The filtrate contains the components of the electric precipitator ash in the following concentrations:

| Component | Mol/l |
| --- | --- |
| Sodium | 4.1 |
| Potassium | 1.4 |
| Chloride | 1.5 |
| Carbonate | 0.7 |
| Sulfate | 1.1 |

After having been washed, the filter cake has a dry substance content of approximately 80%. Its dry substance has the following composition:

| Component | % by weight |
| --- | --- |
| Sodium | 32.3 |
| Potassium | 0.2 |
| Chloride | 0.3 |
| Carbonate | 0.2 |
| Sulfate | 67.0 |

While the present invention has been described in accordance with preferred compositions and embodiments, it is to be understood that certain substitutions and alterations may be made thereto without departing from the spirit and scope of the following claims.

I claim:

1. A process for pumping electric precipitator ash containing chlorides and potassium, the process comprising the steps of:

(a) providing a recirculated filtrate and water;

(b) forming a solution containing electric precipitator ash, recirculated filtrate and water and feeding the solution to a pressure filter disposed in a first vessel;

(c) leaching the solution containing ash in the pressure filter to reduce the chlorides and potassium content of the ash;

(d) filtrating the leached solution to separate off a filter cake and a first filtrate;

(e) recirculating a portion of the first filtrate back to step (a) to provide the recirculated filtrate;

(f) washing the filter cake; and wherein the first filtrate has a ratio of ash, recirculated filtrate and water so that the first filtrate is saturated with sodium sulfate and sodium carbonate but not with respect to sodium chloride and potassium salts.

2. The process of claim 1 wherein the step of leaching includes the step of using a mixture of 1–10 measuring units of recirculated filtrate and one measuring unit of water.

3. The process of claim 1 wherein the step of leaching is carried out in a second vessel and the steps of filtrating and washing take place in the pressure filter.

4. The process of claim 1 wherein the step of leaching takes place at a temperature of between 50 degress Celcius and 100 degrees Celcius.

5. The process of claim 1 wherein the step of filtrating takes place using a pressure difference across the pressure filter that ranges from 0.5 bar and 10 bars.

6. The process of claim 1 wherein the process further comprises the step of drying the filter cake.

7. A process for purifying electric precipitator ash containing chlorides and potassium, the process comprising the steps of:

(a) providing a recirculated filtrate, water and electric precipitator ash containing about 4.3% by weight of chlorides and about 3.7% by weight of potassium;

(b) forming a solution containing electric precipitator ash, recirculated filtrate and water and feeding the solution to a pressure filter disposed in a vessel; wherein the solution contains a mixture of about 1–10 measuring units of recirculated filtrate and one measuring unit of water;

(c) leaching the solution containing ash in the pressure filter at a temperature of between 50° C. and 100° C. to reduce the chlorides and potassium content of the ash;

(d) filtrating the leached solution to separate off a filter cake and a first filtrate, wherein the filtrating step takes place using a pressure difference across the pressure filter ranging from 0.5 bar and 10 bars, the leached solution having a ratio of ash, recirculated filtrate and water so that the first filtrate is saturated with sodium sulfate and sodium carbonate but not with respect to sodium chlorides and potassium salts;

(e) recirculating a portion of the first filtrate back to step (a) to provide the recirculated filtrate;

(f) washing the filter cake; and (g) drying the filter cake.

\* \* \* \* \*